United States Patent Office.

ELISHA WATKINS, OF EAGLEVILLE, CALIFORNIA.

WELDING COMPOUND.

SPECIFICATION forming part of Letters Patent No. 322,223, dated July 14, 1885.

Application filed July 16, 1884. (No specimens.)

*To all whom it may concern:*

Be it known that I, ELISHA WATKINS, of Eagleville, in the county of Modoc and State of California, have invented a new and Improved Welding Compound and Process of Preparing the Same, of which the following is a full, clear, and exact description.

I have discovered that certain materials heretofore used alone and in combination for welding purposes, when prepared in combination by the process hereinafter specified, form a compound of great utility for welding iron and steel, as perfect welds can be made by its use at low heat, and the risk of burning steel while welding is entirely removed.

The compound is made from sal-ammoniac, borax, zinc, and iron filings. The process of preparation is as follows: To a half pound of muriatic acid add one-quarter ounce of sal-ammoniac, one-half ounce of pulverized borax, and one and a half ounce of zinc. The sal-ammoniac and borax are added while the zinc is undergoing decomposition by the acid. The resultant liquid is poured upon iron filings so as just to cover them, and then allowed to stand about three hours, or until the chemical action of the liquid on the filings ceases. The whole is then boiled or heated by a slow fire until dry, and when cold there is added one pound of pulverized borax to each pound of the prepared filings and one ounce of zinc filings.

This compound will weld iron and steel at cherry-red heat, and will prevent steel from burning while taking a weld at any heat, as the steel cannot burn with the compound on it. It will restore burned steel by applying the compound to the burned portion and heating to a welding-heat. It will weld steel after several trials have been made with other compounds, and the weld will be of the most perfect character.

I am aware that sal-ammoniac and iron filings have been added to borax to improve its welding qualities, and that a soldering-liquid has been compounded from muriatic acid, borax, sal-ammoniac, and zinc; but such compounds will not weld and restore burned steel nor weld steel of all kinds at cherry-heat, and at a sparkling heat steel will burn while being welded with those compounds. A low heat being sufficient for welding with my compound, there is a saving of time and fuel.

Having thus described my invention, I claim as new and desire to secure by Letters Patent—

1. The dry-welding compound, composed of borax and zinc filings and iron filings that have been prepared by treatment with muriatic acid, sal-ammoniac, borax, and zinc in about the proportions as specified.

2. The hereinbefore-described process for preparing a welding compound, which consists in first dissolving zinc and borax in muriatic acid and sal-ammoniac, treating iron filings with the resultant liquid, then drying the filings and adding pulverized borax and zinc filings thereto in the proportions substantially as specified.

ELISHA WATKINS.

Witnesses:
ELI McCARTY,
WILBUR F. SMITH.